US010727688B2

(12) United States Patent
Mali et al.

(10) Patent No.: US 10,727,688 B2
(45) Date of Patent: Jul. 28, 2020

(54) POWER MANAGEMENT SYSTEM

(71) Applicant: PedalCell, LLC, Chicago, IL (US)

(72) Inventors: Vishaal Mali, Avon, IN (US); Tarun Subramanian, Evanston, IL (US); Adam Hokin, Chicago, IL (US)

(73) Assignee: PedalCell, LLC, Chicago, IL (US)

( * ) Notice: Subject to any disclaimer, the term of this patent is extended or adjusted under 35 U.S.C. 154(b) by 0 days.

(21) Appl. No.: 16/148,752

(22) Filed: Oct. 1, 2018

(65) Prior Publication Data

US 2019/0103754 A1 Apr. 4, 2019

Related U.S. Application Data

(60) Provisional application No. 62/565,908, filed on Sep. 29, 2017.

(51) Int. Cl.
*H02J 7/14* (2006.01)
*H02J 7/04* (2006.01)
*B62J 99/00* (2020.01)
*H02J 7/34* (2006.01)
*B62M 6/90* (2010.01)
*B62J 45/00* (2020.01)

(52) U.S. Cl.
CPC ............ *H02J 7/1446* (2013.01); *B62J 99/00* (2013.01); *H02J 7/04* (2013.01); *H02J 7/1407* (2013.01); *B62J 45/00* (2020.02); *B62M 6/90* (2013.01); *H02J 7/345* (2013.01)

(58) Field of Classification Search
USPC ........................................................ 320/107
See application file for complete search history.

(56) References Cited

U.S. PATENT DOCUMENTS

| 2008/0290842 | A1 | 11/2008 | Davis et al. |
| 2010/0060231 | A1 | 3/2010 | Trainor et al. |
| 2013/0200617 | A1* | 8/2013 | Smith ................ H02P 9/02 290/43 |
| 2013/0264870 | A1 | 10/2013 | Keysar et al. |
| 2014/0103724 | A1 | 4/2014 | Wagoner |
| 2017/0366008 | A1* | 12/2017 | Simburger .......... H02J 3/382 |

OTHER PUBLICATIONS

International Search Report and Written Opinion of the International Searching Authority prepared by the USPTO in connection with PCT/US2018/053785, dated Jan. 2, 2019; Entire Document (14 pages).

* cited by examiner

*Primary Examiner* — Bryce M Aisaka
(74) *Attorney, Agent, or Firm* — Richards Patent Law P.C.

(57) ABSTRACT

A power management system including a power converter circuit, a supercapacitor storage unit, and a load-sharing controller in communication with the power converter circuit and the supercapacitor storage unit; wherein, in response to executing the program instructions, the load-sharing controller is configured to receive data including the power demand from the external device, receive data including the raw power from the power converter circuit, receive data including a capacity from the supercapacitor storage unit, and direct power to the external device based on the received data.

15 Claims, 5 Drawing Sheets

FIG. 4

POWER MANAGEMENT SYSTEM

CROSS-REFERENCE TO RELATED APPLICATIONS

This application claims the benefit of U.S. Provisional Application No. 62/565,908 filed on Sep. 29, 2017, the entirety of which is incorporated herein by reference.

BACKGROUND OF THE INVENTION

The present subject matter relates generally to optimized and efficient power management systems. More specifically, the present invention relates to a power management system that captures energy from an energy harvesting medium producing a varying supply of power and discharging power stably in response to varying demands.

Given the increase in energy demands, an increase in the use of alternative energy sources clearly follows. While the renewable nature of these sources is attractive, the inconsistencies and fluctuating nature of the power provided by such sources may cause damage to the connected device. Electronic devices to be powered typically operate at a constant voltage, and fluctuating power to a device may damage the batteries, causing the device to shut down, brown out, or be otherwise damaged. Existing solutions to modify the voltage include power regulation topologies such as linear regulators or buck-boost converters. While these solutions provide a constant voltage, they do not address problems related to the inconsistent power supply from and lack of reliability of the renewable energy sources.

One example is the capture of kinetic energy generated by a bicycle. Power generated by a bicycle is directly proportional to the speed of the bicycle, meaning that production peaks at periods of high speed and drops to zero while stopped or at a low speed. There are two primary conventional bicycle-based power generation mechanisms: the hub dynamo and the bottle dynamo. The most commonly used is the hub dynamo, which is built into the hub of a wheel and uses the rotational energy of the wheel as a whole to generate power. Another type of bicycle generator is the bottle dynamo, which uses the sidewall of the wheel instead of the hub to generate power.

Though hub dynamos have been used extensively, the design is typically inefficient and increase the weight of the overall system, making it more difficult for the consumer to pedal. The engineering and designing of an effective build results in a product that is much more expensive. Further, the electric output is not optimal for consumer electronics, and therefore is not efficiently regulated. In the electric regulation, there is no sustainable energy storage source; all sources which are used are untenable and cannot withstand the electric power inputted. Finally, the dynamo of the system maintains contact with the wheel hub at all times regardless of whether or not the device is running, developing an unnecessary drag.

The sidewall generator (or bottle dynamo) includes its share of problems. External factors, primarily environmental, generate friction on the component. Regulation of the electric output for usage in consumer electronics to ensure that there is no damage may be difficult. Appropriate energy storage for delayed use of generated power may be complex.

Another example of a power source providing a fluctuating power source is solar power. Solar panels such as photovoltaic cells are reliant on external factors such as the sun and cloud coverage.

Although batteries provide a consistent amount of power during the life of the battery, the total amount of power able to be supplied is limited to its capacity, which is generally proportional to their physical dimensions and weight. Batteries have a relatively short lifetime and have a limited ability to provide short-term high power. More importantly, battery life is limited by the number of charge-discharge cycles. Once a battery reaches roughly 300 cycles, the battery begins to degrade. Recharging periodically from a continuous power source such as a wall outlet or a car battery has little impact on the battery life. For example, a phone lithium ion battery typically undergoes 300 charge-discharge cycles over the course of a year before the battery life degrades. However, the fluctuating power supply and the constant charge-discharge of the storage unit by a renewable power source such as a bicycle result in up to 100 cycles per day. Such high rates would cause battery degradation within days of beginning use.

Accordingly, there is a need for a power management system that uses a flexible architecture designed to manage the power generated by a energy harvesting medium to allow for stable and consistent power to an external device and its varying needs.

BRIEF SUMMARY OF THE INVENTION

To meet the needs described above and others, the present disclosure provides a power management system that captures power from an unreliable power source and utilizes an ultra-low power architecture to provide a consistent and stable power supply to an external device, from a constant low power demands to spikes of peak demand. In the illustrated embodiment, the power management system is a component of a power generation system that also includes a generator to draw current from an energy harvesting medium.

To illustrate the functioning of the power management system, the energy harvesting medium is a bicycle having the generator of the power generation system secured thereto to capture energy upon rotation of a bike wheel. The power management system includes a power converter circuit, a supercapacitor storage unit, and a load-sharing controller, each in communication with one another. The raw power drawn from the generator is stepped up or down at the power converter circuit and routed to either the external device or the supercapacitor storage unit. The load-sharing controller includes a memory programmed with instructions to route power within the power management system depending on a number of factors. The power management system may include a charger for charging the supercapacitor, a master controller for receiving and processing additional data that impacts the routing of power, and a current modulation circuit for modifying the current being drawn by the generator in order to modify the resistance experience by the user riding the bicycle.

The load-sharing controller memory may include instructions that prioritize the following steps: (1) ensure that a capacity of the supercapacitor storage unit is above a minimum capacity threshold, (2) direct raw power to the external device if the raw power is greater than a power demand of the external device, and (3) direct stored power from the supercapacitor storage unit, optionally in addition to the raw power, to the external device if the raw power is less than the power demand of the external device.

In some embodiments, raw power is directed to the external device only if the raw power is above a minimum power amount (and if the supercapacitor storage unit is above the minimum capacity threshold). In the example of the bicycle generator, the minimum power amount corresponds to a bicycle speed. In this case, the raw power is directed to the external device only if the bicycle speed is above a minimum speed threshold.

The current modulation circuit modifies the current drawn by the generation based on external conditions such as acceleration and elevation data received from an accelerometer and the power demand from the external device. For example, if the bicycle is traveling uphill, the current modulation circuit will reduce the current drawn from the generator which corresponds to less resistance being applied to the bicycle, minimizing the drag felt by the rider. If the bicycle is traveling downhill, the current modulation circuit will increase the current drawn from the generator which corresponds to increased resistance being applied to the bicycle, optimizing the power capture during periods of high production. The current modulation circuit receives data including elevation data from the accelerometer, speed data from the speedometer, and data including power demand and power demand patterns from the external device and calculates an appropriate current to draw so that the resistance is balanced with the speed based on the external factors.

In one embodiment, the power management system includes a power converter circuit that receives raw power from the energy harvesting medium and outputs source power and excess source power, and a supercapacitor storage unit in communication with the power converter circuit that receives the excess source power from the power converter circuit and outputs a stored power. The power converter circuit provides the source power to the external device if the raw voltage is greater than the supercapacitor voltage, and the supercapacitor storage unit provides the stored power to the external device if the supercapacitor voltage is greater than the raw voltage.

In a further embodiment of the present invention, a power management system is in communication with an energy harvesting medium and an external device. The power management system includes a power converter circuit that receives raw power from the energy harvesting medium and outputs source power and excess source power, a supercapacitor storage unit in communication with the power converter circuit and a load-sharing controller, and a load-sharing controller in communication with the power converter circuit and the supercapacitor storage unit. The supercapacitor storage unit receives the excess source power from the power converter circuit and outputs a stored power and has an associated minimum capacity threshold. The power management system further comprises a load-sharing controller memory coupled to the load-sharing controller, with the load-sharing controller memory configured to store load-sharing controller program instructions executable by the load-sharing controller. In response to executing the program instructions, the load-sharing controller is configured to: receive data including the power demand from the external device, receive data including the raw power from the power converter circuit, receive data including capacity from the supercapacitor storage unit, direct the stored power to the external device if the capacity of the supercapacitor storage unit is less than the minimum capacity threshold, direct the source power to the external device and the excess source power to the supercapacitor storage unit if the capacity of the supercapacitor storage unit is greater than the minimum capacity threshold and the raw power is greater than the power demand, and direct the source power and the stored power to the external device the capacity of the supercapacitor storage unit is greater than the minimum capacity threshold and the raw power is less than the power demand.

In a further embodiment, the power converter circuit includes an associated minimum power threshold, and the load-sharing controller is configured to: calculate a remaining charge duration based on the capacity of the supercapacitor storage unit and the power demand, where the remaining time duration corresponds to the amount of additional time that the supercapacitor storage unit can supply stored power to the external device, monitor the low power duration that the raw power is less than the minimum power threshold, and turn off the power management system if the low power duration exceeds the remaining charge duration. In another embodiment, the load-sharing controller is configured to direct the source power to the external device if the raw power is greater than the minimum power threshold.

In a still further embodiment, the load-sharing controller is in communication with a speedometer having a minimum speed threshold associated therewith, and the load-sharing controller is configured to receive speed data from the speedometer, direct the source power to the external device if the speed data is greater than the minimum speed threshold, and direct the stored power to the external device if the speed data is less than or equal to the minimum speed threshold.

In another embodiment, the power management system further includes a current modulation circuit in connection with the power converter circuit, an accelerometer on the energy harvesting medium, and a generator that generates current from the energy harvesting medium. The load-sharing controller is configured to increase or decrease the current drawn from the generator based on data received from the accelerometer. For example, the load-sharing controller is configured to receive elevation data from the accelerometer, increase the current drawn from the generator if the elevation data is increasing, and decrease the current drawn from the generator if the elevation data is decreasing.

In a further embodiment, the load-sharing controller is configured to increase the current drawn from the generator if the power demand is above a minimum threshold, and decrease the current drawn from the generator if the power demand is below a minimum threshold.

In some embodiments, the power management system further includes a master controller. In other embodiments, the load-sharing controller and the master controller are integrated into a single controller.

In a still further embodiment, the power management system further includes a charger in communication with the power converter circuit, where the charger receives the excess source power and outputs a charging power and the supercapacitor storage unit receives charging power from the charger and outputs stored power. The charger may be a constant voltage/constant current charger.

In other embodiments, the supercapacitor storage unit is in communication with a further energy harvesting medium, and the supercapacitor storage unit receives further raw power from the further energy harvesting medium.

In some embodiments, the power converter circuit is in communication with a generator that draws a current from the energy harvesting medium. The generator may be a 3-phase brushless DC generator. In another embodiment, the energy harvesting medium from which the power management system receives power is an electric bicycle, and the external device is the main battery of the electric bicycle.

In another example of the invention, the method for managing power generated by an energy harvesting medium includes the steps of: receiving a raw power and a raw voltage from the energy harvesting medium, receiving a supercapacitor voltage from the supercapacitor storage unit, and comparing the raw voltage and the supercapacitor voltage. The method includes the step of directing a source power from the energy harvesting medium to the external device if the raw voltage is greater than the supercapacitor voltage, and includes the step of directing a stored power from the supercapacitor storage unit to the external device if the supercapacitor voltage is greater than the raw voltage.

In a further embodiment, the method includes the steps of identifying a minimum power threshold of power produced by the energy harvesting medium and directing the source power to the external device if the raw power is greater than the minimum power threshold.

An object of the invention is to provide a solution for stably providing power to an electronic device when the power source is providing inconsistent raw power and the power demands from the external device may vary.

Another object of the invention is to optimize the storage and algorithms of the power management system based on how energy is produced by the energy harvesting medium as well as how the power demand of external devices varies during use. In the example of a bicycle generator, the power management solution is customized to the user's riding frequency and the user's device usage, while modulating the resistance felt by the rider to ensure that the power demands are met while minimizing the additional resistance during cycling.

Another advantage of the invention is that it provides a high-power storage and delivery.

A further advantage of the invention is that it provides intelligent power-switching capabilities.

Another advantage of the invention is that it provides a near frictionless source of power generation.

An additional advantage is it provides a delivery system to harness the mechanical energy produced while riding a bicycle.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
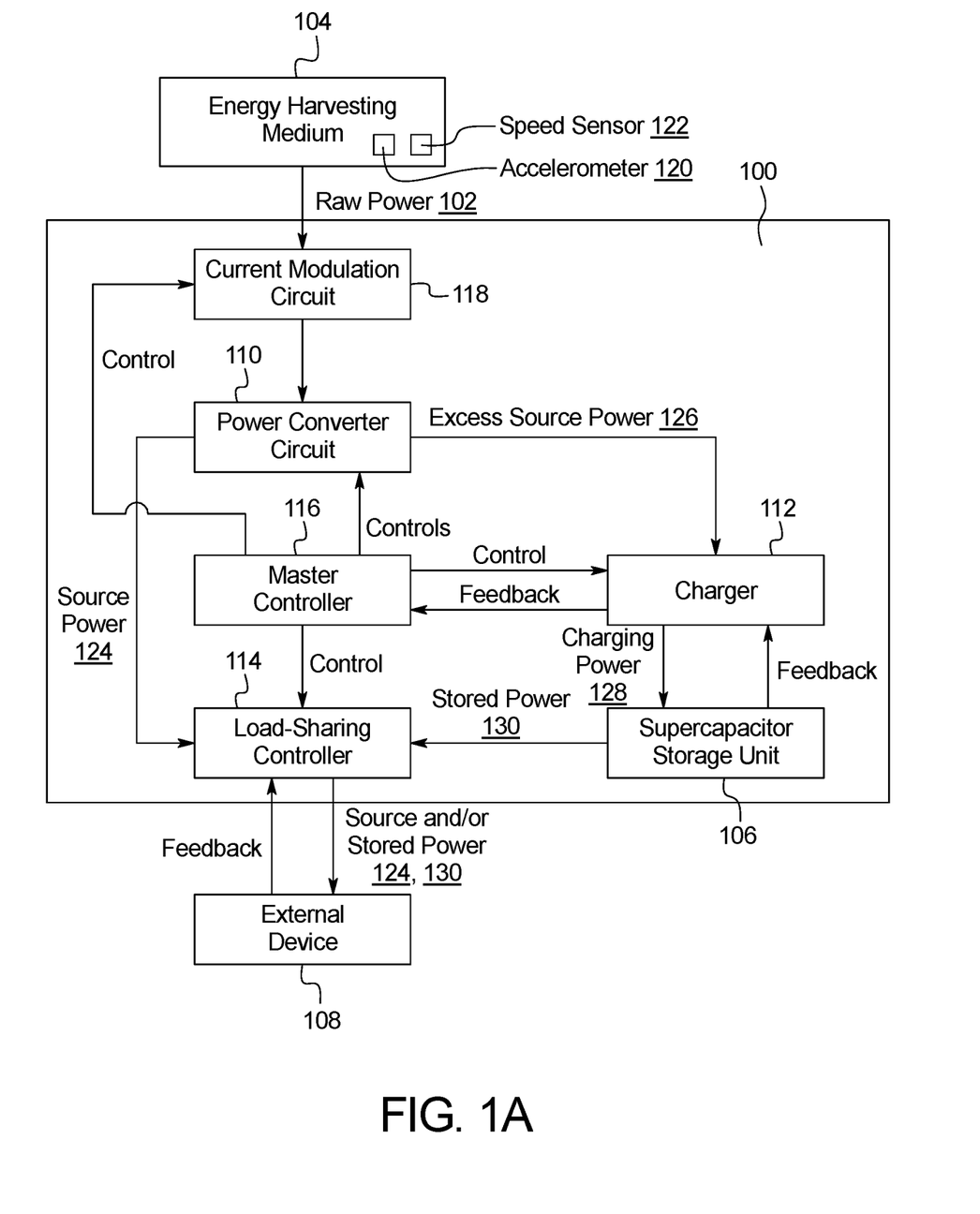
FIG. 1A is a schematic of the power management system of the present application.

FIG. 1A illustrates a power management system 100 of the present application that receives raw power 102 from an energy harvesting medium 104, stores power in a supercapacitor storage unit 106, and powers an external device 108 from either of the energy harvesting medium 104 or the supercapacitor storage unit 106. Utilizing the supercapacitor storage unit 106, the power management system 100 can meet power demands ranging in voltage over short and long periods of time. The power management system 100 is housed within a power generation system 400 (see FIG. 4) that is secured to the energy harvesting medium 104, 404. In the description below, the energy harvesting medium 100 is a bicycle, although other types of mediums such as solar power, wind power, and other mechanical devices may be used.

As shown in FIG. 1A, the power management system 100 includes a power converter circuit 110, a supercapacitor storage unit 106 in connection with a charger 112, and a load-sharing controller 114. In one embodiment, the power management system 100 further includes a master controller 116 that controls the power converter circuit 110, the charger 112, and the load-sharing controller 114. It is also understood that the load-sharing controller 114 and the master controller 116 may be integrated into a single controller in some embodiments. In one example provided herein, the energy harvesting medium is a bicycle generator, and the power management system 100 includes a current modulation circuit 118 to allow for modification of the current drawn by the power management device 100 in order to control resistance experienced by the user.

Figure 4:
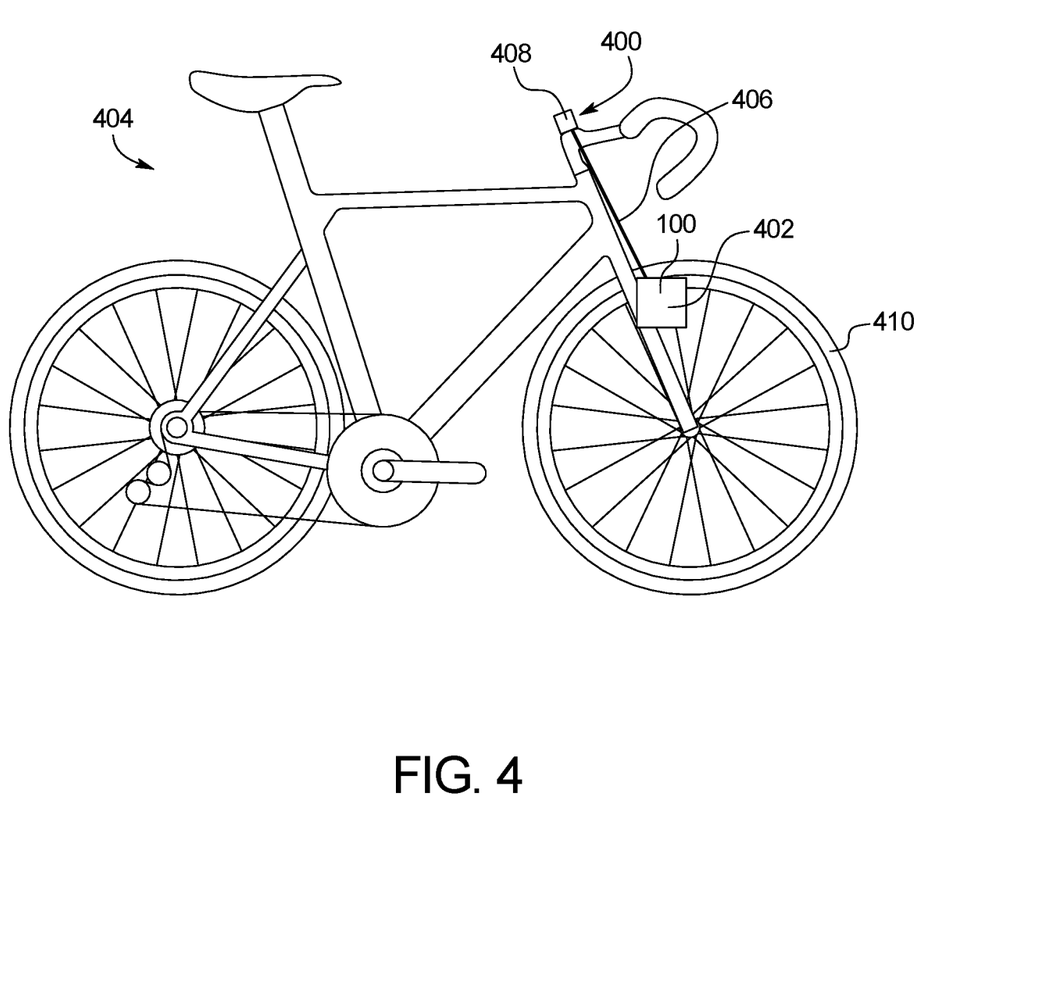
FIG. 4 is a schematic of the power generation system as shown on a conventional bicycle.

In the example of a bicycle 404 as the energy harvesting medium 104 as shown in FIG. 4, the power generation system 400 includes a generator 402 that captures kinetic energy produced by the turning of the wheel 404. The drag added by the power generation system 400 is directly proportional to the current drawn by the generator 402. The current modulation circuit 118 modifies the current drawn by the generator 402 in order to minimize the resistance added to the user cycling experience by the power management system 100. In one example, the circuitry decreases resistance when the cyclist is biking uphill and increases resistance when the cyclist is biking downhill. The power generated when going uphill is not as great as it otherwise would be, but this power loss is made up on the downhill. Similar adjustments to the current are automatically made to minimize resistance when the external device has a low power demand.

As the current supplied by the generator 402 is proportional to the torque, i.e., the drag, of the bicycle wheel 404, the current modulation circuit 118 modifies the current drawn by the generator 402 in order to modify the drag. The power management system 100 applies this modification based on feedback from external sensors such as an accelerometer 120 that detects elevation and movement and a speedometer 122 that detects speed. In one example, a bicycle 404 generates 12 watts of raw power 102 based on a current of 4 amps on a flat surface. Going uphill, the current modulation circuit 118 may decrease the current draw to 3 amps, producing only 9 watts of power. Going downhill, the current modulation circuit 118 may increase the current draw to 6 amps, producing 18 watts of power.

Because the drag applied to the bicycle 404 by the power management system 100 was optimized to accommodate the surrounding area, the resistance felt by the user is minimized while the net power supply has increased.

Referring to FIG. 1A, raw power 102 passes through the current modulation circuit 118 before it reaches the power converter circuit 110. The master controller 116 receives feedback from an accelerometer 120, data including the power demand and consumption data of the external device 108, and feedback from the supercapacitor storage unit 106, and is programmed with instructions to instruct the current modulation circuit 118 to modify the current based on these external factors as described above. Utilizing external sensors 120, 122 responding to environmental factors, the current modulation circuit 118 modulates the resistance in real time to provide an extremely flexible and efficient power management system 100. In some embodiments, the instructions for modifying the current based on the external factors applies weighting factors to the feedback received from the various external sensors 120, 122. In other embodiments, the power management system 100 allows the user to manually manage the resistance and/or to manually manage certain aspects of the resistance, such as a minimum and maximum resistance levels.

The power converter circuit 118 is a topology that receives raw power from the energy harvesting medium 104 and either steps-up or steps-down the voltage depending on how the amount of raw power 102 compares to a predetermined activation level or threshold and/or the power demand of the external device 108. The power converter circuit 110 steps-up voltage if the raw power 102 is less than the predetermined activation level and steps-down voltage if the raw power 102 is greater than the predetermined activation level. As raw power 102 is harvested, the power converter circuit 110 is configured to step-up or step-down the power and to output a source power 124 for directly powering the external device 108 and/or an excess source power 126 to the charger 112 for charging the supercapacitor storage unit 106. Example power converter circuits 110 that may be used include switching regulators, such as buck, boost, and buck-boost, or linear regulators.

The master controller 116 receives a power demand from the external device 108 and compares the power demand to the raw power 102 being produced by the energy harvesting medium 104 and modifies the voltage as necessary. In the illustrated embodiment, the master controller 116 utilizes a pulse width modulation signal to control the power converter circuit 110.

When the power demand is less than the raw power 102, any excess source power 126 is directed to the supercapacitor storage unit 106 for later use. The master controller 116 may direct the power converter circuit 110 to send the excess source power 126 to the charger 112. The charger 112 outputs a charging power 128 to charge the supercapacitor storage unit 106, which provides feedback to the charger 112 in order to maintain smooth operation. Supercapacitors provide longer cycle times utilizing less energy density than those provided by batteries. In other embodiments, alternative storage means such as lithium-ion batteries or lithium-ion polymer batteries may be used.

The supercapacitor storage unit 106 charges in either constant current charging mode or constant voltage charging mode. In constant current charging mode, the supercapacitor unit requires a constant current during charging until a stable voltage level is reached. Once the stable voltage level is reached, the supercapacitor storage unit 106 transitions to the constant voltage charging mode, as the current exponentially drops, until the supercapacitor storage unit 106 reaches charge capacity. During the discharging phase, the voltage decreases linearly as the charge decreases. A DC-DC boost converter may be used to step-up the voltage in order to allow for the voltage to stay consistent when delivering power.

The supercapacitor storage unit 106 provides flexible and high-power delivery that can both store the excess power 126 when the raw power 102 generated by the energy harvesting medium 104 is greater than the power demand of the external device 108 while also supplying stored power 130 to the connected device 108 on an as-needed basis, providing high power loads for short periods of time when the power demand is greater than the raw power 102. The amount of raw power 102 produced by the energy harvesting medium 104 is dependent on external factors such as the bicycle speed in the case of a bicycle generator or overcast weather in the case of solar panels. The supercapacitor storage unit 106 provides a buffer that allows for a consistent power supply to the connected device as well as a sufficient power supply to the connected device during high peak demands when the raw power is insufficient.

The supercapacitor storage unit 106 may also adjust the timescales to deliver high amounts of power in short spurts of time when necessary. For example, the supercapacitor storage unit 106 is able to charge and discharge within milliseconds, meaning that while the energy harvesting medium 104 can supply 10 W of instantaneous power for one minute, the supercapacitor unit, and therefore the power management system, can deliver 20 W of power for 30 seconds, presuming an ideal system without any efficiency losses. In some cases, the external, connected device 108 may demand a relatively low power load during regular use and may demand a peak power load on occasion. For example, a cellular signal sensor may draw 1 W on idle mode and require a 10 W burst when pinging a signal to a cellular tower. Using an energy harvesting medium 104 that is providing 2 W of raw power 102, the power management system 100 would supply sufficient power directly from the energy harvesting medium 104 when the device 108 is in idle mode and draw stored power 130 from the supercapacitor storage unit 106 during peak demand. By utilizing timescales to adjust to deliver high amounts of power, the master controller 116 minimizes the resistance added to the bicycle, which compliments the efficiencies provided by the current modulation circuit 118.

The load-sharing controller 114 includes program instructions that allow the components of the power management system 100 to operate as an ideal diode by directing power to either of the external device 108 or the supercapacitor storage unit 106. The load-sharing controller 114 utilizes transistors in tandem with a feedback mechanism to switch between the raw/source power 102, 124 from the energy harvesting medium 104 and the stored power 130 of the supercapacitor storage unit 106. This technology may be used for external devices 108 that require high reliability, similar to how a computer memory compensates for small and unpredictable brownouts common with wall adapters. While the platform prioritizes raw power 102, 124 coming from the energy harvesting medium 104, the power management system 100 may rapidly switch to the stored power 130 of the supercapacitor storage unit 130 when needed. The platform is versatile in that it can support an array of power sources with the ability to prioritize each source as desired. The transistors may be a field effect transistor that provides the necessary function needed. For example, the transistors may be p-channel or n-channel MOSFETS. The feedback mechanism may be a linear amplifier, transistors, or a microcontroller, or any other suitable circuitry.

Figure 2:
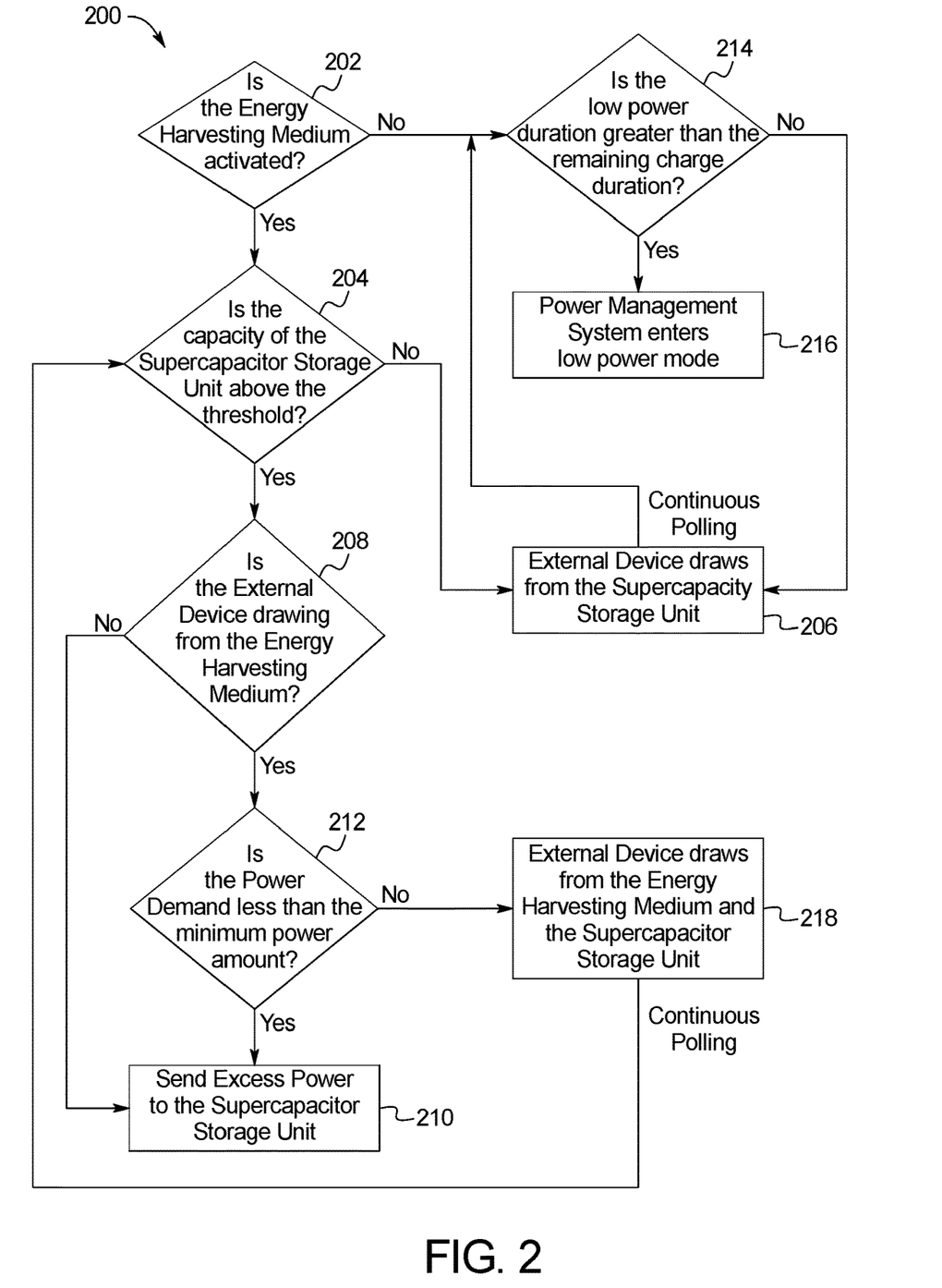
FIG. 2 is an example logic flowchart of the power management system of FIG. 1A.
Figure 3:
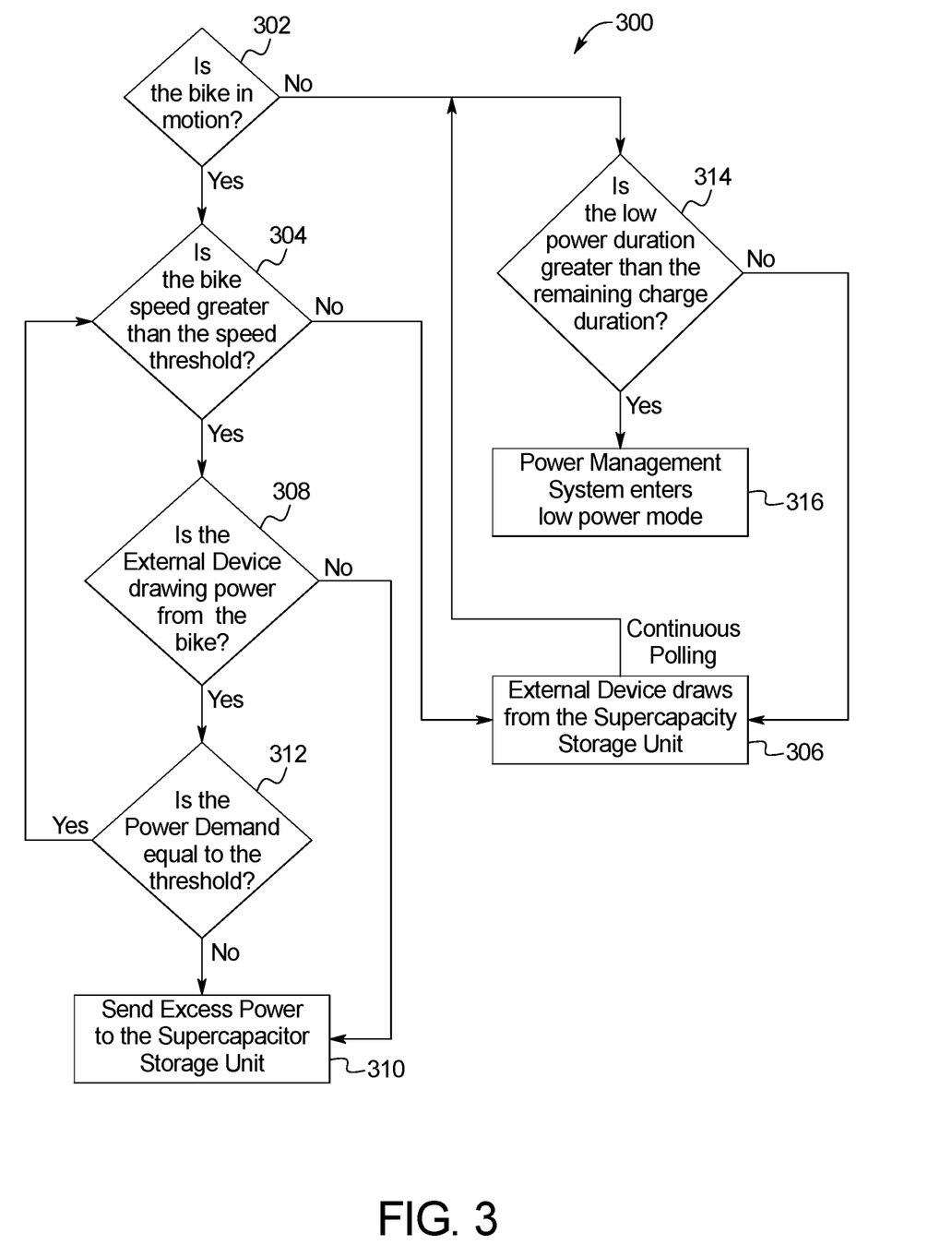
FIG. 3 is a further embodiment of the logic flowchart of FIG. 2.

FIG. 2 illustrates an example logic utilized by the load-sharing controller 114 of the power management system 100 to select the power source for the external device 108, factoring the external device's power demands into the decisions. FIG. 3 illustrates the basic example logic of FIG. 2 specific a bicycle generator as the energy harvesting medium. It is noted that the logic may be carried out by the load-sharing controller, the master controller, or an integrated load-sharing/master controller.

In the first step 202, the load-sharing controller 114 determines whether the energy harvesting medium 104 has been activated and power is being generated. In the case of a bicycle generator, the first step 302 is whether the bicycle is in motion. In the case of a solar power generator, the question may be whether sufficient solar energy is available to produce power.

If YES, the load-sharing controller 114 determines whether the supercapacitor storage unit is above a predetermined threshold capacity in step 204, 304. If NO, the load-sharing controller 114 instructs the external device 108 to draw stored power 130 from the supercapacitor storage unit 106 in step 206, 306, in order to charge the supercapacitor 106 as well as to power the external device 108. In some embodiments, the load-sharing controller 114 continuously polls whether the supercapacitor storage unit 106 has reached the threshold capacity in step 206, 306, and returns to step 204, 304 once it has. If YES, the load-sharing controller 114 determines whether the external device 108 is drawing power from the energy harvesting medium 104 in step 208, 308.

In another embodiment, the load-sharing controller 114 may determine whether a minimum amount of power is being produced in step 204, 304 before proceeding to direct the external device 108 to draw power from the energy harvesting medium 104. As discussed above, the amount of current drawn by the generator is proportional to the torque or resistance experienced by the rider. When the power demand from the external device 108 is significantly greater than the raw power 102 being produced, the power management system 100 pulls a large current to balance out the small voltage being produced. This large current draw results in the application of a large resistance to the bicycle, making it difficult to ride the bicycle. By only drawing current once a minimum speed threshold is reached, the power management system 100 avoids applying excessive resistance during periods of low power production. As applied broadly to energy harvesting mediums 104, the power management system 100 draws raw power 102 only after a minimum power threshold is met in order to avoid excessive resistance applied to the energy harvesting medium 104 during low power production. Once the raw power 102 meets this threshold amount, the external device 108 may draw power 102, 124 from the energy harvesting medium 104 via the power convertor circuit 110. In the case of the bicycle generator 404, the question in step 304 is whether the bike speed is greater than a speed threshold, the speed threshold being selected based on its power production value. If a negligible amount of power is being produced and the answer is NO, the load-sharing controller 114 instructs the external device 108 to draw stored power 130 from the supercapacitor storage unit 106 in step 206, 306.

As the external device 108 draws stored power 130 from the supercapacitor storage unit 106 in step 206, 306, all raw power 102 produced by the energy harvesting medium 104 is directed to the supercapacitor storage unit 106 as excess source power 126.

In step 208, 308, the load-sharing controller 114 determines whether the external device 108 is drawing power 102, 124 from the energy harvesting medium 104. If NO, the load-sharing device 114 instructs the power converter circuit 110 to send excess power 126 to the supercapacitor storage unit 106 in step 210, 310. If YES, the load-sharing controller 114 determines whether the power demand of the external device 108 is less than the minimum power amount in step 212. As the minimum power amount corresponds to the speed threshold in the case of the bike generator, step 312 is the step of determining whether the power demand of the external device 108 is equal to the speed threshold.

If NO, meaning that the power demand is equal to or greater than the minimum power amount (or the speed threshold of the bicycle generator example), the load-sharing controller 114 allows the external device 108 to draw from both of the energy harvesting medium 104 and the supercapacitor storage unit 106 in step 218, 318, and continuously monitors whether the capacity of the supercapacitor storage unit 106 is above the minimum threshold capacity in step 204, 304. If the power demand is less than the minimum power amount (or the speed threshold of the bicycle generator example), the power converter circuit 110 sends excess source power 126 to the supercapacitor storage unit 106 in step 210, 310.

If the energy harvesting medium 104 is not activated in step 202 (i.e., that the bicycle is not in motion in step 302), the load-sharing controller 114 uses the capacity information of the supercapacitor storage unit 106 and the power demand of the external device 108 to determine a remaining charge duration, or the amount of time that the power management system 100 will be able to supply power to the external device 108 before the capacity of the supercapacitor storage unit 106 drops to zero. The load-sharing controller 114 also monitors the low power duration, or the amount of time at which the raw power is less than a minimum power amount, and determines whether the low power duration is greater than the remaining charge duration step 214, 314. If YES, meaning that stored power 130 from the supercapacitor storage unit 106 has been used, the load-sharing controller 114 shifts the power management system 100 into low power mode, shutting off the system 100 and resetting the software, in step 216, 316. If NO, the load-sharing controller 114 allows the external device 108 to draw stored power 130 from the supercapacitor storage unit 106 in step 206, 306. When the external device 108 is drawing stored power 130 from the supercapacitor storage unit 106, the load-sharing controller 114 regularly and continuously monitors the action of step 214, 314 so that the power management system 100 enters low power mode when needed.

In one embodiment, the ultra low-power architecture of the power management system is based on event-driven architecture programmed on the master controller. During use, the master controller operates in low-power mode until an event triggers the execution of program instructions to accomplish certain tasks. For example, the master controller monitors the capacity of the supercapacitor storage unit and takes action when the capacity drops below a specific threshold. In that event, the controller closes the gate that enables the external device to draw source power from the power converter circuit, and opens the gate that directs excess source power to the supercapacitor storage unit.

In another example, the external device, which consistently requires a constant low power demand less than the source power, pings a cell phone tower, requiring immediate peak power demand. The master controller monitors the power demand of the external device, determines that the power demand suddenly exceeds the source power, closes the gate that enables the external device to draw source power from the power converter circuit, opens the gate that directs excess source power to the supercapacitor storage unit, and adjusts the timescales and power supply as necessary to meet the peak demand.

In a further example, the master controller receives data from a speed sensor. When the speed sensor drops below a specific speed threshold, the master controller closes the gate that enables the external device to draw source power from the power converter circuit and opens the gate that directs excess source power to the supercapacitor storage unit.

In a further embodiment, the power management system 100 may include a regenerative power circuit that receives power from the energy harvesting medium at energy capture points other than the generator 402. In one example, an energy capture point on an electric bike is a regenerative braking system that produces kinetic energy that is converted to mechanical energy for either powering an external device or a supercapacitor storage unit.

Figure 1B:
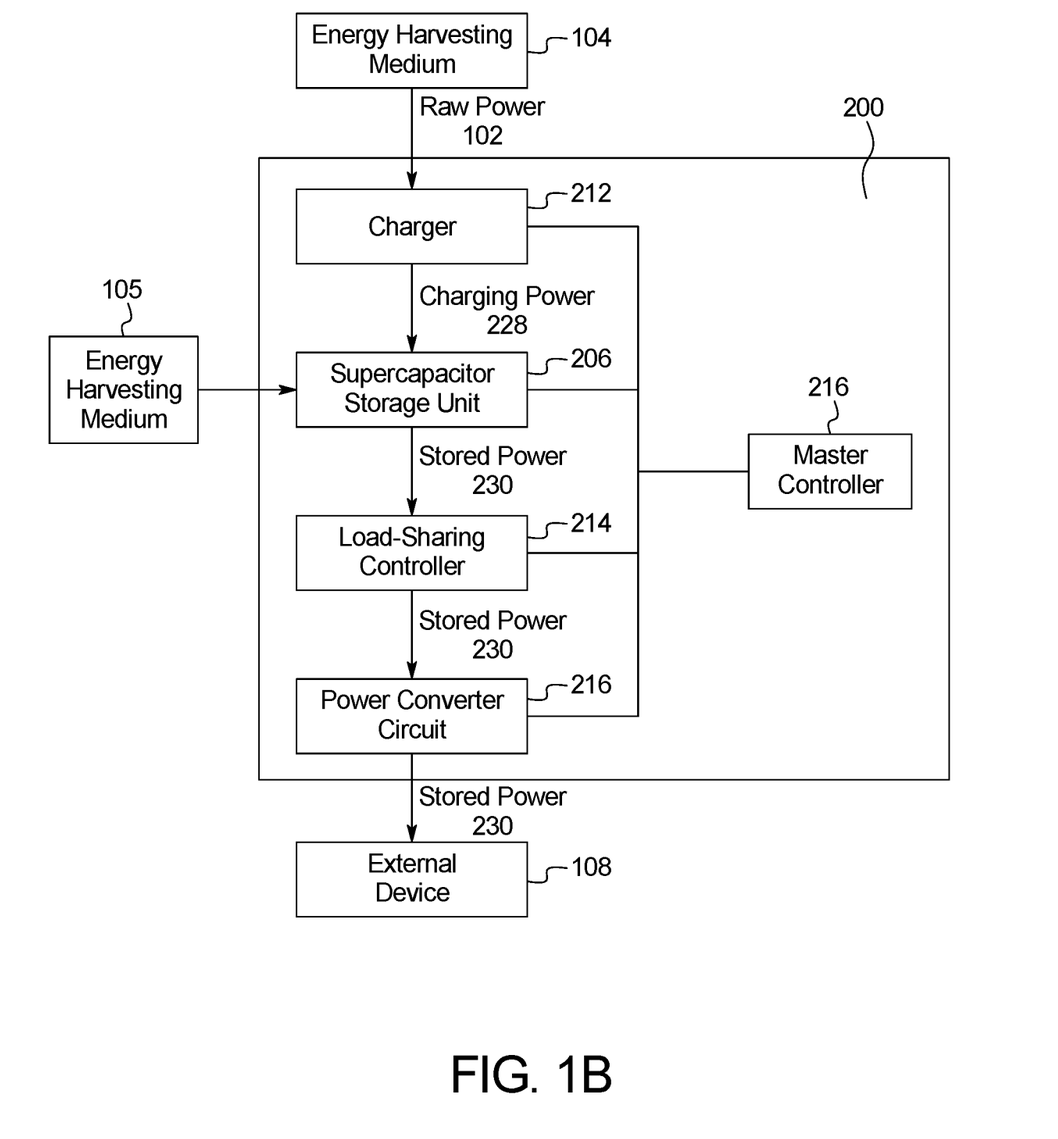
FIG. 1B is a schematic of an alternative embodiment of the power management system of the present application.

The embodiment of the power management system illustrated in FIG. 1A is an example embodiment that may be used, but the order and orientation of the components may vary as desired or as required based on the use. FIG. 1B illustrates an alternative embodiment of the power management system 200 that directs raw power from the energy harvesting medium 104 through the supercapacitor storage unit 206 before and sends the charged power to the power converter circuit 210. Any suitable arrangement of components may be used. Additionally, the supercapacitor storage unit 106, 206 may receive charging power directly from a further energy harvesting medium(s) 105 in addition to or instead of the primary energy harvesting medium 104.

The power management system 100 described above may be integrated into a power generation system 400 that captures power from an energy harvesting medium 104. In the illustrated embodiment, the energy harvesting medium 104 is a bicycle 404, and the power generation system 400 includes components that capture the kinetic energy produced through use of the bicycle in order to power a connected device directly or indirectly through storage units.

As shown in FIG. 4, the power generation system 400 includes a mechanical device 402 secured to the sidewall of the front tire 410 of a bicycle 404 and a port or a wireless charging mat or surface 408 for charging the external device 108. In the illustrated embodiment, the port 408 is secured to the stem of the bicycle 404, although the location of the port 408 may be elsewhere on the bicycle 404. The power management system 100 is housed with the mechanical device 402 within the power generation system 400. Electricity is transferred from the mechanical device 402 to the port 408 through a cable 414 or other suitable means. The mechanical device 402 includes a generator, such as a 3-phase brushless DC generator, a hub dynamo, or a bottle dynamo.

The mechanical and electrical units 402, 100 are enclosed by a casing which is made of a polymer or a polymer reinforced with other solid materials. The final casing may include a thermal dissipation unit and a polymer-based material to act as a platform for the electronics 100 to rest for protection against mechanical agitation. In some embodiments, the electronics component 100 is housed within the mechanical device 402, while in other embodiments, the electronics component 100 is distal from the mechanical device 402.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A power management system in communication with an energy harvesting medium and an external device, the power management system comprising:
    a power converter circuit that receives raw power from the energy harvesting medium and outputs source power and excess source power;
    a supercapacitor storage unit in communication with the power converter circuit and a load-sharing controller, wherein the supercapacitor storage unit receives the excess source power from the power converter circuit and outputs a stored power, wherein the supercapacitor storage unit has an associated minimum capacity threshold;
    the load-sharing controller in communication with the power converter circuit and the supercapacitor storage unit; and
    a load-sharing controller memory coupled to the load-sharing controller, wherein the load-sharing controller memory is configured to store load-sharing controller program instructions executable by the load-sharing controller;
    wherein, in response to executing the program instructions, the load-sharing controller is configured to:
        receive data including the power demand from the external device;
        receive data including the raw power from the power converter circuit;
        receive data including a capacity from the supercapacitor storage unit;
        direct the stored power to the external device if the capacity of the supercapacitor storage unit is less than the minimum capacity threshold;
        direct the source power to the external device and the excess source power to the supercapacitor storage unit if the capacity of the supercapacitor storage unit is greater than the minimum capacity threshold and the raw power is greater than the power demand;
        direct the source power and the stored power to the external device the capacity of the supercapacitor storage unit is greater than the minimum capacity threshold and the raw power is less than the power demand.

2. The power management system of claim 1, wherein the power converter circuit includes an associated minimum power threshold, and wherein, in response to executing the program instructions, the load-sharing controller is configured to:
    calculate a remaining charge duration based on the capacity of the supercapacitor storage unit and the power demand, wherein the remaining time duration corresponds to the amount of additional time that the supercapacitor storage unit can supply stored power to the external device;
    monitor the low power duration, wherein the low power duration corresponds to the amount of time that the raw power is less than the minimum power threshold; and turn off the power management system if the low power duration exceeds the remaining charge duration.

3. The power management system of claim 1, wherein the power converter circuit includes an associated minimum power threshold, and wherein, in response to executing the program instructions, the load-sharing controller is configured to:
direct the source power to the external device if the raw power is greater than the minimum power threshold.

4. The power management system of claim 1, wherein the load-sharing controller is in communication with a speedometer having a minimum speed threshold associated therewith, and wherein, in response to executing the program instructions, the load-sharing controller is configured to:
receive speed data from the speedometer;
direct the source power to the external device if the speed data is greater than the minimum speed threshold; and
direct the stored power to the external device if the speed data is less than or equal to the minimum speed threshold.

5. The power management system of claim 1, further comprising a master controller and a master controller memory, wherein the master controller memory is configured to store master controller program instructions executable by the master controller.

6. The power management system of claim 5, further comprising a current modulation circuit in connection with the power converter circuit, an accelerometer on the energy harvesting medium, and a generator that generates current from the energy harvesting medium, and wherein, in response to executing the program instructions, the master controller is configured to increase or decrease the current drawn from the generator based on data received from the accelerometer.

7. The power management system of claim 6, wherein, in response to executing the program instructions, the load-sharing controller is configured to:
receive elevation data from the accelerometer;
increase the current drawn from the generator if the elevation data is increasing; and
decrease the current drawn from the generator if the elevation data is decreasing.

8. The power management system of claim 6, wherein, in response to executing the program instructions, the load-sharing controller is configured to:
increase the current drawn from the generator if the power demand is above a minimum threshold; and
decrease the current drawn from the generator if the power demand is below a minimum threshold.

9. The power management system of claim 5, wherein the load-sharing controller and the master controller are integrated into a single controller.

10. The power management system of claim 1, further comprising a charger in communication with the power converter circuit, wherein the charger receives the excess source power and outputs a charging power, wherein the supercapacitor storage unit receives charging power from the charger and outputs stored power.

11. The power management system of claim 10, wherein the charger is a constant voltage/constant current charger.

12. The power management system of claim 1, wherein the supercapacitor storage unit is in communication with a further energy harvesting medium, and wherein the supercapacitor storage unit receives further raw power from the further energy harvesting medium.

13. The power management system of claim 1, wherein the power converter circuit is in communication with a generator that draws a current from the energy harvesting medium.

14. The power management system of claim 13, wherein the generator is a 3-phase brushless DC generator.

15. The power management system of claim 1, wherein the external device is a battery of an electric bicycle.

* * * * *